(12) United States Patent
Christiansen et al.

(10) Patent No.: US 10,981,791 B2
(45) Date of Patent: Apr. 20, 2021

(54) GRAPHITE OXIDE REINFORCED FIBER IN HOSTS SUCH AS CONCRETE OR ASPHALT

(71) Applicant: Garmor Inc., Orlando, FL (US)

(72) Inventors: Sean Christiansen, Orlando, FL (US); David Restrepo, Orlando, FL (US); Richard Stoltz, Plano, TX (US); Jeff Bullington, Orlando, FL (US)

(73) Assignee: Garmor Inc., Orlando, FL (US)

( * ) Notice: Subject to any disclaimer, the term of this patent is extended or adjusted under 35 U.S.C. 154(b) by 74 days.

(21) Appl. No.: 15/564,637

(22) PCT Filed: Mar. 31, 2016

(86) PCT No.: PCT/US2016/025307
§ 371 (c)(1),
(2) Date: Oct. 5, 2017

(87) PCT Pub. No.: WO2016/167981
PCT Pub. Date: Oct. 20, 2016

(65) Prior Publication Data
US 2018/0086643 A1  Mar. 29, 2018

Related U.S. Application Data

(60) Provisional application No. 62/146,650, filed on Apr. 13, 2015.

(51) Int. Cl.
| | |
|---|---|
| *C01B 32/198* | (2017.01) |
| *C04B 14/02* | (2006.01) |
| *C04B 20/10* | (2006.01) |
| *C04B 28/04* | (2006.01) |
| *C01B 32/23* | (2017.01) |
| *B82Y 30/00* | (2011.01) |
| *C08L 95/00* | (2006.01) |

(52) U.S. Cl.
CPC ............ *C01B 32/198* (2017.08); *C01B 32/23* (2017.08); *C04B 14/024* (2013.01); *C04B 20/1055* (2013.01); *C04B 20/1066* (2013.01); *C04B 28/04* (2013.01); *B82Y 30/00* (2013.01); *C01B 2204/04* (2013.01); *C01B 2204/32* (2013.01); *C08L 95/00* (2013.01); *C08L 2555/50* (2013.01)

(58) Field of Classification Search
CPC ................. C01B 32/198; C01B 32/23; B29B 15/10–105
See application file for complete search history.

(56) References Cited

U.S. PATENT DOCUMENTS

| | | |
|---|---|---|
| 2,459,520 A | 1/1949 | Greenshields |
| 5,057,370 A | 10/1991 | Krieg et al. |
| 5,360,582 A | 11/1994 | Boyd et al. |
| 5,501,934 A | 3/1996 | Sukata et al. |
| 5,506,061 A | 4/1996 | Kindl et al. |
| 5,583,176 A | 12/1996 | H aberle |
| 5,883,176 A | 3/1999 | Gerroir et al. |
| 6,004,712 A | 12/1999 | Barbetta et al. |
| 6,172,163 B1 | 1/2001 | Rein et al. |
| 6,348,279 B1 | 2/2002 | Saito et al. |
| 6,436,567 B1 | 8/2002 | Saito et al. |
| 7,005,205 B1 | 2/2006 | Gyoten et al. |
| 7,231,084 B2 | 6/2007 | Tang et al. |
| 7,329,698 B2 | 2/2008 | Noguchi et al. |
| 7,623,340 B1 | 11/2009 | Song et al. |
| 8,168,964 B2 | 5/2012 | Hiura et al. |
| 8,216,541 B2 | 7/2012 | Jang et al. |
| 8,580,132 B2 | 11/2013 | Lin et al. |
| 9,758,379 B2 | 9/2017 | Blair |
| 9,802,206 B2 | 10/2017 | Kitaura et al. |
| 10,138,969 B2 | 11/2018 | Hattori et al. |
| 10,287,167 B2 | 5/2019 | Blair |
| 2002/0008031 A1 | 1/2002 | Barsukov et al. |
| 2002/0119358 A1 | 8/2002 | Rock |
| 2002/0182387 A1 | 12/2002 | Mercuri et al. |
| 2004/0000735 A1 | 1/2004 | Gilbert, Sr. et al. |
| 2004/0033189 A1 | 2/2004 | Kaschak et al. |
| 2004/0071896 A1 | 4/2004 | Kang |
| 2004/0209150 A1 | 10/2004 | Rock et al. |
| 2005/0041373 A1 | 2/2005 | Pruss |
| 2005/0191471 A1 | 9/2005 | Haggquist |
| 2005/0196636 A1 | 9/2005 | Kawakami et al. |

(Continued)

FOREIGN PATENT DOCUMENTS

| | | |
|---|---|---|
| CN | 101462889 A | 6/2009 |
| CN | 102021633 A | 4/2011 |

(Continued)

OTHER PUBLICATIONS

Extended European Search Report and Opinion for EPO 17185605.7 dated Nov. 29, 2017, 7 pp.
International Search Report and Written Opinion for PCT/US2017/058512 from KIPO dated Feb. 7, 2018, 14 pp.
Extended European Search Report for EP 16765526.5 dated Feb. 13, 2018, 7 pp.
Extended European Search Report for EP 16769452.0 dated Mar. 1, 2018, 9 pp.

(Continued)

*Primary Examiner* — Alex A Rolland
(74) *Attorney, Agent, or Firm* — Edwin S. Flores; Chalker Flores, LLP

(57) ABSTRACT

This can be a method of making a high strength composite reinforcing fiber using flat GO flakes coated on a conventional reinforcing fiber. This maintains some the flexibility of the fiber and aligns the flat graphene flakes along the surface of the fiber; this dramatically increases the strength of the fiber. It also allows bonding between overlapping flakes, in contrast to flakes being uniformly dispersed in a host material that is being reinforced and dramatically increases the strength of the host material.

18 Claims, No Drawings

(56) References Cited

U.S. PATENT DOCUMENTS

| | | |
|---|---|---|
| 2005/0208319 A1 | 9/2005 | Finley et al. |
| 2007/0219336 A1 | 9/2007 | Ito |
| 2007/0284557 A1 | 12/2007 | Gruner et al. |
| 2008/0048153 A1 | 2/2008 | Jang et al. |
| 2008/0206124 A1 | 8/2008 | Jang et al. |
| 2008/0279710 A1 | 11/2008 | Zhamu et al. |
| 2008/0318110 A1 | 12/2008 | Budinski et al. |
| 2009/0017211 A1 | 1/2009 | Cruner et al. |
| 2009/0092747 A1 | 4/2009 | Zhamu et al. |
| 2009/0140801 A1 | 6/2009 | Ozyilmaz et al. |
| 2009/0215953 A1 | 8/2009 | Hwang et al. |
| 2009/0224420 A1 | 9/2009 | Wilkinson |
| 2009/0241496 A1 | 10/2009 | Pintault et al. |
| 2010/0006445 A1 | 1/2010 | Tomatschger |
| 2010/0028681 A1 | 2/2010 | Dai et al. |
| 2010/0055025 A1 | 3/2010 | Jang et al. |
| 2010/0055458 A1 | 3/2010 | Jang et al. |
| 2010/0056819 A1 | 3/2010 | Jang et al. |
| 2010/0092809 A1 | 4/2010 | Drzal et al. |
| 2010/0143732 A1 | 6/2010 | Swift et al. |
| 2010/0147188 A1 | 6/2010 | Mamak et al. |
| 2010/0151318 A1 | 6/2010 | Lopatin et al. |
| 2010/0209731 A1 | 8/2010 | Humano |
| 2010/0239870 A1 | 9/2010 | Bowen |
| 2010/0296253 A1 | 11/2010 | Miyamoto et al. |
| 2010/0317790 A1 | 12/2010 | Jang et al. |
| 2011/0017585 A1 | 1/2011 | Zhamo et al. |
| 2011/0041980 A1 | 2/2011 | Kim et al. |
| 2011/0049437 A1 | 3/2011 | Crain et al. |
| 2011/0088931 A1 | 4/2011 | Lettow et al. |
| 2011/0120347 A1 | 5/2011 | Chung et al. |
| 2011/0143018 A1 | 6/2011 | Peng et al. |
| 2011/0159372 A1 | 6/2011 | Zhamu et al. |
| 2011/0223405 A1 | 9/2011 | Compton et al. |
| 2011/0256376 A1 | 10/2011 | Compton et al. |
| 2011/0267673 A1 | 11/2011 | Agrawal et al. |
| 2011/0274610 A1 | 11/2011 | Paquette et al. |
| 2011/0281034 A1 | 11/2011 | Lee et al. |
| 2012/0025131 A1 | 2/2012 | Forero |
| 2012/0025420 A1 | 2/2012 | Utashiro et al. |
| 2012/0055612 A1 | 3/2012 | Ahmed et al. |
| 2012/0077017 A1 | 3/2012 | Buresch |
| 2012/0107562 A1 | 3/2012 | Bolotin et al. |
| 2012/0129736 A1* | 5/2012 | Tour .............. B82Y 30/00 507/140 |
| 2012/0220198 A1 | 8/2012 | Peukert et al. |
| 2012/0228555 A1 | 9/2012 | Cheng et al. |
| 2012/0282419 A1 | 11/2012 | Ahn et al. |
| 2012/0298396 A1 | 11/2012 | Hong et al. |
| 2012/0298620 A1 | 11/2012 | Jiang et al. |
| 2013/0015409 A1 | 1/2013 | Fugetsu |
| 2013/0018207 A1 | 1/2013 | Jeon et al. |
| 2013/0114367 A1 | 5/2013 | Heusinger et al. |
| 2013/0156678 A1 | 6/2013 | Banerjee et al. |
| 2013/0217222 A1 | 8/2013 | Johnson et al. |
| 2013/0236715 A1 | 9/2013 | Zhamu et al. |
| 2013/0240033 A1 | 9/2013 | Jeon et al. |
| 2013/0264041 A1 | 10/2013 | Zhamu et al. |
| 2013/0272950 A1 | 10/2013 | Yun et al. |
| 2014/0018480 A1 | 1/2014 | Lee et al. |
| 2014/0030590 A1 | 1/2014 | Wang et al. |
| 2014/0117745 A1 | 5/2014 | Wilke et al. |
| 2014/0134092 A1* | 5/2014 | Shankman .............. B82Y 30/00 423/415.1 |
| 2014/0143018 A1 | 5/2014 | Nies et al. |
| 2014/0204384 A1 | 7/2014 | Lee et al. |
| 2014/0227211 A1 | 8/2014 | Shankman |
| 2014/0272199 A1 | 9/2014 | Lin et al. |
| 2014/0299475 A1 | 10/2014 | Bullington et al. |
| 2015/0266739 A1 | 9/2015 | Zhamu et al. |
| 2015/0367436 A1 | 12/2015 | Chiu et al. |
| 2016/0016803 A1 | 1/2016 | Stoltz et al. |
| 2016/0144339 A1 | 5/2016 | Kim et al. |
| 2017/0166722 A1 | 6/2017 | Zhamu et al. |
| 2017/0233290 A1 | 8/2017 | Christiansen et al. |

FOREIGN PATENT DOCUMENTS

| | | | |
|---|---|---|---|
| CN | 102586952 A | 7/2012 | |
| CN | 102719719 A | 7/2012 | |
| CN | 103058541 A | 4/2013 | |
| CN | 103130436 A | 6/2013 | |
| CN | 103215693 A | 7/2013 | |
| CN | 103408880 A | 11/2013 | |
| CN | 103545536 A | 1/2014 | |
| CN | 103757823 A | 4/2014 | |
| CN | 103819915 A | 5/2014 | |
| CN | 103962102 A | 8/2014 | |
| CN | 104319372 A | 1/2015 | |
| CN | 104446176 A | 3/2015 | |
| CN | 104844930 A | 4/2015 | |
| CN | 106700356 A | 5/2017 | |
| CN | 108276576 A | 7/2018 | |
| EP | 0949704 A1 | 10/1999 | |
| EP | 1227531 A1 | 7/2002 | |
| EP | 2560228 A1 | 2/2013 | |
| GB | 723598 A | 2/1955 | |
| JP | 64-009808 A | 1/1989 | |
| JP | 2012007224 A | 1/2012 | |
| JP | 2012136567 A | 7/2012 | |
| KR | 20110119429 A | 11/2011 | |
| KR | 20130048741 A | 4/2013 | |
| KR | 20130090979 A | 8/2013 | |
| KR | 1020150026092 | 3/2015 | |
| RU | 2456361 C1 | 7/2012 | |
| WO | 2009032069 | 3/2009 | |
| WO | WO-2009032069 A1 * | 3/2009 | ............... H01B 1/24 |
| WO | 2009059193 A1 | 5/2009 | |
| WO | 2010089326 A1 | 8/2010 | |
| WO | 2010091352 A2 | 8/2010 | |
| WO | 2011014242 A1 | 2/2011 | |
| WO | 2011074125 | 6/2011 | |
| WO | 2011078639 A2 | 6/2011 | |
| WO | 2011086391 A1 | 7/2011 | |
| WO | 2011087301 | 7/2011 | |
| WO | 2011099761 A1 | 8/2011 | |
| WO | 2011162727 A1 | 12/2011 | |
| WO | 2012058553 A2 | 5/2012 | |
| WO | 2012148880 A2 | 11/2012 | |
| WO | 2012177864 A1 | 12/2012 | |
| WO | 2013001266 A1 | 1/2013 | |
| WO | 2013096990 A1 | 7/2013 | |
| WO | 2014080144 A1 | 5/2014 | |
| WO | 2014104446 A1 | 7/2014 | |
| WO | 2014138587 A1 | 9/2014 | |
| WO | 2014210584 A1 | 12/2014 | |
| WO | 2015065893 A1 | 5/2015 | |
| WO | 2016040612 A1 | 3/2016 | |
| WO | 2016123080 A1 | 8/2016 | |
| WO | 2016154057 | 9/2016 | |
| WO | 2016200469 A1 | 12/2016 | |
| WO | 2017053204 A1 | 3/2017 | |
| WO | 2018008143 A1 | 5/2018 | |

OTHER PUBLICATIONS

Extended European Search Report for EP 16780450.9 dated Apr. 19, 2018, 17 pp.

Jeon, I-Y., et al., "Large Scale Production of Edge-Selectively Functionalized Graphene Nanoplatelets via Ball Milling and Their Use as Metal-Free Electrocatalysts for Oxygen Reduction Reaction," J Am Chem Soc (2013), 135-1386-1393.

Li, Y., et al., "Hybridizing wood cellulose and graphene oxide toward high-performance fibers," NPG Asia Materials, 7, Jan. 9, 2015, 14 pp.

Oh, Won-Chun, et al., "The Effect of Thermal and Ultrasonic Treatment on the Formation of Graphene-oxide Nanosheets," Journal of the Korean Physical Society, vol. 56, No. 4, Apr. 2010, pp. 1097-1102.

Tissera, N., et al., "Hydrophobic cotton textile surfaces using an amphiphilic graphene oxide (GO) coating," Applied Surface Science, 324, Nov. 4, 2014 (2015), pp. 455-463.

Yuanyuan, L., et al. "Hybridizing Wood Cellulose and Graphene Oxide toward High-Performance Fibers," NPG Asia Materials (2015) 7(e150), 14 pp.

(56) References Cited

OTHER PUBLICATIONS

Academic Press Dictionary of Science and Technology ("Flake", p. 1, obtained online Aug. 19, 2016).
Bourlinos, A.B., et al., "Graphite Oxide: Chemical Reduction to Graphite and Surface Modification with Primary Aliphatic Amines and Amino Acids," Langmuir 2003, vol. 19, pp. 6050-6055.
Ebinezar, et al., "Analysis of hardness test for aluminum carbon nanotube metal matrix and graphene," Indian Journal of Engineering, vol. 10, No. 21, 2014, pp. 33-39.
Extended European Search Report and Opinion for EPO 12844344.7 dated Oct. 22, 2015, 8 pp.
Extended European Search Report and Opinion for EPO 14759787.6 dated Oct. 6, 2016, 13 pp.
Extended European Search Report and Opinion for EPO 14760912.7 dated May 11, 2016, 8 pp.
Fang, M., et al., ""Covalent polymer functionalization of graphenenanosheets and mechanical properties of composites"" Journal of Materials Chemistry, 2009, vol. 19, No. 38, pp. 7098-7105.
Feng, H., et al., "A low-temperature method to produce highly reduced graphene oxide," Nature Communications, Feb. 26, 2013, 8 pp.
FMC, Persulfates Technical Information, (http://ww.peroxychem.com/media/90826/aod_brochure_persulfate.pdf, downloaded on Jan. 19, 2017) 16 pp.
Herman, A., et al., "Bipolar plates for PEM fuel cells: a review." International Journal of Hydrogen Energy, 2005, vol. 30, No. 12, pp. 1297-1302.
Hwang, T., et al., "One-step metal electroplating and patterning on a plastic substrate using an electrically-conductive layer of few-layer graphene," Carbon, Sep. 17, 2011, vol. 50, No. 2, pp. 612-621.
International Search Report and Written Opinion for PCT/US2012/061457 from KIPO dated Mar. 15, 2013, 10 pp.
International Search Report and Written Opinion for PCT/US2014/021765 from KIPO dated Jul. 24, 2014, 11 pp.
International Search Report and Written Opinion for PCT/US2014/021810 from KIPO dated Jul. 14, 2014, 10 pp.
International Search Report and Written Opinion for PCT/US2014/062371 from KIPO dated Feb. 11, 2015, 12 pp.
International Search Report and Written Opinion for PCT/US2015/045657 from KIPO dated Oct. 27, 2015, 6 pp.
International Search Report and Written Opinion for PCT/US2015/049398 from KIPO dated Dec. 16, 2015, 13 pp.
International Search Report and Written Opinion for PCT/US2016/014873 from KIPO dated May 13, 2016, 15 pp.
International Search Report and Written Opinion for PCT/US2016/022229 from KIPO dated Jun. 27, 2016, 15 pp.
International Search Report and Written Opinion for PCT/US2016/023273 from KIPO dated Jul. 12, 2016.
International Search Report and Written Opinion for PCT/US2016/023435 from KIPO dated May 30, 2016, 13 pp.
International Search Report and Written Opinion for PCT/US2016/025307 from KIPO dated Sep. 12, 2016, 11 pp.
International Search Report and Written Opinion for PCT/US2016/025338 from KIPO dated Jul. 25, 2016, 12 pp.
International Search Report and Written Opinion for PCT/US2016/052292 from KIPO dated Nov. 21, 2016, 14 pp.
International Search Report and Written Opinion for PCT/US2017/027231 from KIPO dated Jul. 11, 2017, 18 pp.
Jeon, I., et al., ""Edge-carboxylated graphene nanosheets via ball milling."" Proceedings of the National Academy of Sciences of the United States of AmericaPNAS, Apr. 10, 2012, vol. 109, No. 15, pp. 5588-5593.
Liu, Y. B., et al., "Recent development in the fabrication of metal matrix-particulate composites using powder metallurgy techniques," Journal of Materials Science, vol. 29, No. 8, 1994, pp. 1999-2007.
McQuarrie (2011, General Chemistry (4th Edition). University Science Books, Appendix G "Standard Reduction Voltages for Aqueous Solutions at 25C, p. A-34 to A-37 and also p. 949, Table 25.3. Online version available at:http://app.knovel.com/hotlink!toc/id:kpGCE00013/general-chemistry-4th/general-chemistry-4th)".
Merriam-Webster ("Definition of Flake" p. 1-9, obtained online Aug. 19, 2016).
Mohajerani, E., et al., "Morphological and thickness analysis for PMMA spin coated films," Journal of Optoelectronics and Advanced Materials, vol. 9:12, Dec. 2007, p. 3901-3906.
Moustafa, S.F., et al., "Copper matrix SiC and Al2O3 particulate composites by powder metallurgy technique," Materials Letters, 2002, vol. 53, No. 4, pp. 244-249.
Ong, T. S., et al, "Effect of atmosphere on the mechanical milling of natural graphite," Carbon, 2000, vol. 38, No. 15, pp. 2077-2285.
Rafiee, M. et al., "Fracture and fatigue in graphene nanocomposites." Small, 2010, vol. 6, No. 2, pp. 179-183.
Steurer, P., et al., ""Functionalized graphenes and thermoplasticnanocomposites based upon expanded graphite oxide."" Macromolecular Rapid Communications, 2009, vol. 30, Nos. 4-5, pp. 316-327.
Szabo, T., et al., "Evolution of Surface Functional Groups in a Series of Progressively Oxidized Graphite Oxides," Chem. Mater., vol. 18, Mar. 29, 2006, pp. 2740-2749.
Taeseon, H., et al.,"One-step metal electroplating and patterning on a plastic substrate using an electrically conductive layer of few-layer graphene," Carbon, Elsevier, Oxford, GB, vol. 50, No. 2, Sep. 8, 2011, pp. 612-621.
USP Technologies, "What is the pH of H2O2 solutions?," http://www.h2o2.com/faqs/FaqDetail.aspx?fId=26, accessed Jan. 19, 2017, 2 pp.
Wang, X. et al., ""In situ polymerization of graphene nanosheets andpolyurethane with enhanced mechanical and termal properties."" Journal of materials Chemistry, 2011, vol. 21, No. 12, pp. 4222-4227.
Wang, Y., et al., "Electrochemical Delamination of CVD-Grown Graphene Film: Toward the Recyclable Use of Copper Catalyst," ACS Nano, vol. 5, No. 12, Oct. 30, 2011, pp. 9927-9933.
Wu, Z-S. et al., "Field Emission of Single-Layer Films Prepared by Electrophoretic Deposition." Advanced Materials, 21, 2009, pp. 1756-1760.
Zhao, W., et al., "Preparation of graphene by exfoliation of graphite using wet ball milling." Journal of Materials Chemistry, Jun. 3, 2010, vol. 20, pp. 5817-5819.
Kaur S., et al., "Enhanced thermal transport at covalently functionalized carbon nanotube array interfaces," Nature Communications, Jan. 22, 2014, pp. 1-8.
Maguire, J. A., et al., "Efficient low-temperature thermal functionalization of alkanes. Transfer dehydrogenation catalyzed by Rh(PMe3)2Cl(Co) in solution under a high-pressure hydrogen atmosphere," J. Am. Chem. Soc., Aug. 1, 1991, vol. 113:17, pp. 6706-6708.
Kirschner, M., "Ozone," Ullmann's Encyclopedia of Industrial Chemistry, vol. 25, 2012, pp. 637-644.
Minus, M., et al., "The Processing, Properties, and Structure of Carbon Fibers," JOM, Feb. 2005, pp. 52-58.
Pauling, L., General Chemistry, Chapter 15, "Oxidation-Reduction Reactions. Electrolysis," Dover Publications, Inc., 1970, 41 pp.
Polymers: A Properties Database, "Poly(ethylene terphthalate)", Chemnetbase, downloaded from http://poly.chemnetbase.com, Jan. 24, 2016, 5 pp.
Extended European Search Report for EP 16849382.3 dated Apr. 30, 2019, 10 pp.
Extended European Search Report for EP 17865997.5 dated Jul. 22, 2019, 7 pp.
International Search Report and Written Opinion for PCT/US2019/051405 from KIPO dated Jan. 3, 2020, 11 pp.
Babak, F., et al., "Preparation and Mechanical Properties of Graphene Oxide: Cement Nanocomposites," The Scientific World Journal, vol. 2014, ID 276323, 10 pp.
Extended European Search Report for EP 15834377.2 dated Mar. 9, 2018, 8 pp.
Extended European Search Report for EP 16780450.9 dated Jul. 13, 2018, 18 pp.

(56) References Cited

OTHER PUBLICATIONS

Rahman, M.A., et al., "The effect of residence time on the physical characterists of PAN-based fibers produced using a solvent-free coagulation process," Materials Science and Engineering A 448, 2007, pp. 275-280.
Wang, Q., et al., "Nanostructures and Surface Nanomechanical Properties of Polyacrylonitrile/Graphene Oxide Composite Nanofibers by Electrospinning," J. Appl. Polym. Sci., 2013.
Wu, Q., et al., "Suprecapacitors Based on Flexible Graphene/Polyaniline Nanofiber Composite Films," ACS Nano (2010), 4(4):1963-1970.
Xia, et al., "Effects of resin content and preparing conditions on the properties of polyphenylene sulfide resin/graphite composite for bipolar plate," Journal of Power Sources, vol. 178, Dec. 5, 2007, pp. 363-367.
CN 102586952 Google translation 7 pp.
CN 103545536 Google translation 5 pp.

* cited by examiner

GRAPHITE OXIDE REINFORCED FIBER IN HOSTS SUCH AS CONCRETE OR ASPHALT

CROSS-REFERENCE TO RELATED APPLICATIONS

This application is the National Stage of International Application No. PCT/US2016/025307, filed on Mar. 31, 2016 claiming the priority to U.S. Provisional Application No. 62/146,650 filed on Apr. 13, 2015, the contents of each of which are incorporated by reference herein.

TECHNICAL FIELD OF THE INVENTION

The present invention relates in general to the field of high electrical conductivity nanocomposites, and more particularly, graphite oxide reinforced fiber in hosts such as concrete or asphalt.

BACKGROUND OF THE INVENTION

Without limiting the scope of the invention, its background is described in connection with composite materials.

Graphene is one of the strongest materials ever tested. Various research institutes have loaded hosts with carbon allotropes such as carbon nanotubes (CNT), graphene flakes (GF), graphene oxide (GO), and graphite oxide and have seen up to a 200% increase in tensile strength in the loaded host, but with inconsistent results. Measurements have shown that graphene has a breaking strength 200 times greater than steel, with a tensile modulus (stiffness) of 1 TPa (150,000,000 psi). An atomic Force Microscope (AFM) has been used to measure the mechanical properties of a suspended graphene sheet. Graphene sheets held together by Van der Waals forces were suspended over $SiO_2$ cavities where an AFM tip was probed to test its mechanical properties. Its spring constant was in the range 1-5 N/m and the Young's modulus was 0.5 TPa (500 GPa) thereby demonstrating that graphene can be mechanically very strong and rigid.

Carbon nanotubes (CNTs) depending on whether they are single walled CNTs (SWCNTs) or multi-walled CNTs (MWCNTs), generally have the diameter of 1-3 nm or 5-50 nm, respectively. The length of CNTs can be up to centimeters, which gives an aspect ratio exceeding 1000. CNTs also exhibit extraordinary strength with moduli of elasticity on the order of TPa and tensile strength in the range of GPa. With the concurrent benefits of high aspect ratio and excellent mechanical performance, CNTs have been found to improve the physical properties of cementitious or asphalt materials. Not only are CNTs extremely expensive, but also poor dispersion of CNTs is generally the reason for not achieving the desired enhancement of the physical properties of the composite. CNTs and graphene are often difficult to disperse due to the strong Van der Waal's attractive forces between particles and the interaction of the particles in the host material. CNTs and graphene materials tend to form agglomerates or self-attraction/assembly similar to that seen in carbon black creating defect sites in the composites. Without the use of a dispersing agent carbon based cement composites have worse mechanical properties than the plain cement paste. Non-uniform distribution/dispersion of CNTs and graphene bundles are responsible for the deterioration of the mechanical properties.

Some classic engineered structures such as reinforced concrete may not be recognized as a composite. The fact is that cement/concrete with rebar (short for reinforcing bar) qualifies as a composite. The rebar, having specific physical properties that significantly exceed those of the surrounding matrix is placed into a pattern to optimize the strength of the composite.

Other composite engineered structures such as fiber-reinforced plastics cement and asphalt are generally recognized as composites. Such structures are often engineered to create the best combination of lowest weight and increased strength.

SUMMARY OF THE INVENTION

This invention relates to a novel method of making an engineered composite structure using flat flakes of at least one of graphene, reduced graphene oxide and graphene oxide, and coating the flakes on the surface of fibers, such that the flake reinforced fibers can be used to reinforce other materials. These can have the potential to be used to reinforce a large number of host materials (e.g. concrete, glass, or plastic) because graphene is one of the strongest materials ever tested.

In one embodiment the present invention includes a method of making a high strength composite reinforcing fiber comprising: providing graphene oxide (GO) flakes; providing a conventional reinforcing fiber; and coating said GO flakes on said conventional reinforcing fiber. In one aspect, the GO flakes are substantially flat. In another aspect, the substantially flat GO flakes with a surface area to thickness ratio greater than 300 Angstroms, and thickness of less than 160 Angstroms, wherein the graphene flakes have no significant physical surface distortions, having no significant epoxy functionalization and has an oxidation level greater than 1.5% by mass. In another aspect, the GO flakes have a surface area to thickness ratio greater than 300 Angstroms, and thickness of less than 160 Angstroms, and wherein the graphene flakes have no significant physical surface distortions, having no significant epoxy functionalization and has an oxidation level less than 1.5% by mass. In another aspect, 95% of the GO flakes are from about 0.8 to 16 nanometers in thickness. In another aspect, 95% of the GO flakes have a surface area to thickness ratio of a minimum of 300 Angstroms. In another aspect, the maximum dimension of the GO flakes between 220 Angstroms and 100 microns. In another aspect, the GO flakes have primarily edge oxidation. In another aspect, the method further comprises the step of mechanochemical exfoliating graphite into graphene/graphite oxide flakes is done in a stirred media mill, and the stirred media mill is an attrition mill or ball mill.

In another embodiment the present invention includes a method of making a high strength structure: comprising: providing GO flakes; providing a conventional reinforcing fiber; providing the structure's host material; coating said GO flakes on said conventional reinforcing fiber; air drying said coated fiber; incorporating said coated fiber into the structure's host material; and forming into the structure's host material with the incorporated said coated fiber into a structure. In one aspect, the GO flakes are substantially flat. In another aspect, the flakes with a surface area to thickness ratio greater than 300 Angstroms, and thickness of less than 160 Angstroms, wherein the GO flakes have no significant physical surface distortions, having no significant epoxy functionalization and has an oxidation level greater than 1.5% by mass, and are combined with Ordinary Portland Cement and other dry powders. In another aspect, the method further comprises the step of mixing the GO flakes in the host material for at least 30 minutes in a sonic mixing system. In another aspect, the method further comprises the step of adding water to react the powders with one or more materials that form concrete to form a concrete composite when cured. In another aspect, the GO flakes with a surface area to thickness ratio greater than 300 Angstroms, and thickness of less than 160 Angstroms, wherein the GO flakes have no significant physical surface distortions, having no significant epoxy functionalization and has an oxidation level less than 1.5% by mass, and said flakes are combined with sand and other dry powders. In another aspect, the method further comprises the steps of mixing the GO and the host material for at least 30 minutes in a sonic mixing system, and adding Bitumen or other non-polar material to react the powders to form a composite when cured. In another aspect, the GO flakes have a mass greater than 0.00005% than the mass of the dry powder material. In another aspect, 95% of the GO flakes are from about 0.8 to 16 nanometers in thickness. In another aspect, 95% of the GO flakes have a surface area to thickness ratio of a minimum of 300 Angstroms. In another aspect, the maximum dimension of the GO flakes between 220 Angstroms and 100 microns. In another aspect, the GO flakes have primarily edge oxidation. In another aspect, the GO flake surfaces have the same hydrophobicity as the other powders. In another aspect, the method further comprises the step of mechanochemical exfoliating graphite into graphene/graphite oxide flakes in a stirred media mill, and the stirred media mill is an attrition mill or ball mill.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are illustrative of ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

As used herein, the term "graphene" refers to a polycyclic hexagonal lattice with carbon atoms covalently bonded to each other. The covalently bonded carbon atoms can form a six-member ring as a repeating unit, and may also include at least one of a five-member ring and a seven-member ring. Multiple graphene layers are referred to in the art as graphite. Thus, graphene may be a single layer, or also may comprise multiple layers of graphene that are stacked on other layers of graphene yielding graphene oxide. Generally, graphene oxide can have a maximum thickness of about 100 nanometers (nm), specifically about 0.5 nm to about 90 nm.

As used herein, the term "graphene oxide flake" refers to a crystalline or "flake" form of graphene oxide that has been oxidized and includes many graphene sheets oxidized and stacked together and can have oxidation levels ranging from 0.01% to 25% by weight in ultra pure water. The flakes are preferably substantially flat.

This can be a method of making a high strength composite reinforcing fiber using flat GO flakes coated onto a conventional, e.g. plastic or glass, reinforcing fiber. This coating maintains some the flexibility of the fiber and aligns the flat graphene flakes along the surface of the fiber; this dramatically increases the strength of the fiber. It can also allow some bonding between partially overlapping flakes, in contrast to flakes being uniformly widely dispersed in a host material that is being reinforced.

This can also be a method of making a high strength structure using composite reinforcing fiber having flat GO flakes coated on a conventional reinforcing fiber. This maintains some the flexibility of the fiber during the combining of the host material with the composite reinforcing fiber.

Various research institutes have loaded hosts with carbon allotropes such as carbon nanotubes (CNT), graphene flakes (GF), and graphene oxide have seen up to a 200% increase in tensile strength in the loaded host. Measurements have shown that graphene has a breaking strength 200 times greater than steel, with a tensile strength of 130 GPa. An Atomic Force Microscope (AFM) has been used to measure the mechanical properties of a suspended graphene sheet. A graphene sheet was suspended over a $SiO_2$ substrate with cavities and was probed with an AFM tip to test its mechanical properties. Its spring constant was in the range 1-5 N/m and the Young's modulus was 0.5-1 TPa, thereby demonstrating that graphene can be mechanically very strong and rigid. Despite these nano-scale mechanical properties, neither graphene nor graphene oxide has transitioned to commercial use in a macro-scale mechanical structure due to price and dispersion related issues.

In the past, the process of producing a loaded host has not necessarily translated to a viable composite structure. The inability to translate the technology to a viable composite structure is a combination of technical issues, including uniform distribution/dispersion of the suspension in the host material, inadequate bonding of the reinforcing agent to the host material, and cost factors. Traditionally, dispersion has been accomplished in a liquid host by a combination of sonication and stirring. In some cases the liquid or slurry of particles have been modified through functionalization of the particle or additive, or by modifying the host's viscosity, pH, or through the use of surfactants, as a means of improving dispersion and mechanical bonding. Interactions between the liquid host and particle, particle-to-particle interaction/attraction and the settling of the particles have significantly and negatively impacted the uniformity of the dispersion which is deleterious to the strength of the resulting composite. In general, too highly concentrated graphene oxide/functionalized-graphite oxide (GO), GO or reduced oxide GO (rGO) additive in a host can result in the stacking or aggregation of the additive, resulting in thicker GO or rGO structures which create point defects in the host. These thicker GO or rGO structures are stacked sheets held together by Van der Waals forces that can slip relative to each other, thereby creating point defects in the host. Such point defects will result in the composite having a lower mechanical strength. Additive loadings greater than a few percent generally result in flocculation or loose agglomeration resulting in these point defects.

Graphene oxide, when uniformly dispersed in the host or in an engineered/designed pattern, facilitates load transfer and mechanical support for greater structural strength. This technical approach offers the potential to replace the use of metallic reinforcements that corrode and lose mechanical integrity with a much more chemically stable additive.

Preferably using GO and rGO as mechanical enhancement additives, there is good interfacial bonding between the graphene/graphite oxide flake and the host's matrix. Improving the interfacial bonding generally has two important aspects. Preferably the flake surfaces that are substantially planar; not distorted through the graphene/graphite oxide flake production process; some production processes, e.g. the "Hummers" process, produce distorted flakes.

Preferably the chemistry of the flakes in addition allows full entrainment of the flakes into the host's matrix. Relative short, e.g. "chopped" fibers are preferred as they distribute the strengthening more evenly.

Non-limiting examples of a "host" or "host material", which terms are used interchangeably, for use with the present invention include, e.g., ordinary Portland cement, polypropylene (PP), polyethylene (PE), Polycarbonate (PC), ceramic powders, ceramic powder is aluminum oxide, zirconium oxide, silica, silicon dioxide, or combination thereof, metal powders, metal powders of titanium, titanium hydride, tantalum, cobalt chrome, niobium, stainless steel, nickel, copper, aluminum, or combinations thereof, a polycrystalline material, polyvinylidene fluoride (PVF), or polyvinylidene difluoride (PVDF), polyurethane, poly(butyleneterephthalate), nylon 11, poly(ethyleneterephthalate), poly(ether ether ketone), poly(phenylene sulfide), polyolefin, an oxide, carbonate or silicate of an element of Groups 2a, 3a, 4a and 4b of the Periodic Table, poly(vinyl chloride) (PVC), poly(methylmethacrylate), polystyrene, polycarbonate/nylon alloy, polycarbonate/polyester alloy, ABS, ABS/nylon alloy, ABS/PVC alloy, acrylic copolymers, polysulfone, polysulfone/ABS alloy, polyetherimides, polyamide-imides, polyarylates, fluoropolymers, polyphenylene oxide/polystyrene blend, or poly(phenylene sulfide).

For example, graphene/graphite oxide flake chemistry may be changed by modifying the flake edge carboxylate group by thermal treatment or with chemical functionalization that can tailor the polarity and/or create a functional group that is compatible with the host's chemistry (e.g., polarity, hydrophobicity, etc.). Functionalizing the graphene/graphite oxide additive with a similar chemistry to the host allows the graphene additive to be directly incorporated in the long or short range ordering or bonding. The host can include plastics, metals, cement, asphalt, ceramics, and glass materials.

Larger graphene surface area to thickness ratios better mitigate and distribute a mechanical load, giving the host enhanced mechanical properties, including but not limited to increased tensile, shear, and flexural strength. The ability to achieve substantial enhancement of the host's mechanical properties can be obtained with a flake with an area of 48400 $Å^2$ and a thickness of 160 Å to 200 Å with a surface area to thickness ratio of about 200 Å. A surface area to thickness ratio equal to or greater than 200 Å can provide enhancement to the host's mechanical properties.

In preferred embodiments, the flake thicknesses is 16 nanometers or less, as too many layers significantly reduce the tensile strength (preferably, 95% of our flakes are from about 0.8 to 16 nanometers thick, and our surface area to thickness ratio is greater than 48400:1 Angstroms). Preferably, the maximum dimension of the flake varies between 220 Angstroms and 100 microns in diameter; this requires precise process control or a process that allows separation of the graphene flakes by surface area and/or thickness.

Uniform distribution, dispersion and/or entrainment of graphene/graphite functionalized flakes within the host, e.g. cement or asphalt, can be achieved through several methods, including: use of an additional powder or multiple powder additives, mixing prior to reacting, casting or otherwise causing the powders to become ordered by thermal, chemical, electrical or other processes that induce order or bonding between the powders, e.g. solidified or gelled. The functionalization can be an oxidation in the form of epoxied or carboxylic groups or other functionalization such as amine, fluorine, chlorine, or other chemicals that react with the host.

Chopped fibers can be used as an additive to enhance the mechanical performance of a composite. Chopped fibers have been used in composite hosts including: Plastics, cement, asphalt and other host materials used in composites. A wide number of fiber additives have been used for many years as a strength-enhancing additive in cement and asphalt they include: metal, plastic, glass, ceramic and CNT fibers to modify the physical characteristics. The fibers generally do not chemically react to the host material. The fibers provide mechanical enhancement by creating a tortuous threaded structure throughout the host on the millimeter/centimeter scale reinforcement. GO coated E-glass laminate has been shown to have a large impact on the physical properties with only a 0.01 wt % GO before resin cure [1] 200× increase in uniaxial flexural fatigue life 1-2 orders of magnitude better than SWNT and MWNT 3 to 5× increase in tension fatigue life and 20-30% increased flexural strength.

While GO, rGO, CNTs and chopped fibers have been used separately and in some cases in conjunction with each other to enhance the strength of the host. GO/rGO coated fibers have never been used in cement and asphalt. Further, to date GO/rGO coated fibers have apparently never been used as a strength-enhancing additive for any host.

The GO/rGO has a functionalization or decoration of COOH, epoxied or other functional group that allows the $GO_f/rGO_f$ to react with both the fiber and the host.

The functionalization is denoted by $GO_f/rGO_f$. Preferably the $GO_f/rGO_f$ loading would be greater than 0.01% (w) and preferably less than 1% (w) to the composite host material. The $GO_f/rGO_f$ coated fibers react with the host creating a strength-enhanced region of the host that when combined with other regions in the host have a macroscopic impact on the overall physical properties.

In some embodiments, chopped fibers can be spray or dip coated with a $GO_f/rGO_f$ suspension. The suspension can have a concentration between 5% (w) and 0.0001% (w). Thus the suspension is compatible with the fiber and has a reasonable vapor pressure to allow ease of drying. Ethanol and acetone can be used as a suspension media. Utilizing a compressor driven airbrush paint gun that produced droplets at 0.1 mm droplet size at a rate of 1 ml/min can be used to coat the chopped glass fiber. The chopped glass fiber is preferably less than 6 cm in length and less than 0.5 mm in diameter. The specific fiber length and thickness can be chosen for the given final composite structure. The coated chopped fiber is preferably air dried before incorporating into the cement or asphalt host. The cement or asphalt host is then cured to optimize the strength. During the curing the $GO_f/rGO_f$ material can react with host material.

For cement, the epoxy and COOH groups chemically react with the calcium silica hydrate (CSH) which is a nano scale gel in the cement. The $GO_f/rGO_f$ material on the fiber catalyzes CSH gel to grow into much larger crystal structures surrounding and extending the strength around the fiber into three dimensions of the cement. The catalyzed CSH crystal structure dramatically extends and improves the mechanical properties of the host cement. Similarly the asphalt the $GO_f/rGO_f$ material can react with thermal plastic (bitumen) within the asphalt, dramatically extending and improving the mechanical properties of the host.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of". As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step or a limitation) or group of integers (e.g., feature(s), element(s), characteristic(s), propertie(s), method/process steps or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

What is claimed is:

1. A method of making a high strength composite reinforcing fiber comprising:

providing substantially flat graphene oxide (GO) flakes;

providing a reinforcing fiber;

providing a host material;

coating the GO flakes on the reinforcing fiber; and wherein 95% of the substantially flat GO flakes have a surface area to thickness ratio of a minimum of 300 Angstroms and a thickness of less than 160 Angstroms, wherein the graphene flakes have no significant physical surface distortions and no significant epoxy functionalization and wherein surfaces of the GO flakes have the same hydrophobicity as the host material.

2. The method of claim 1, wherein the substantially flat GO flakes have an oxidation level greater than 1.5% by mass.

3. The method of claim 1, wherein the GO flakes have an oxidation level less than 1.5% by mass.

4. The method of claim 1, wherein 95% of the GO flakes are from about 0.8 to 16 nanometers in thickness.

5. The method of claim 1, wherein the maximum dimension of the GO flakes is between 220 Angstroms and 100 microns.

6. The method of claim 1, wherein the GO flakes have primarily edge oxidation.

7. The method of claim 1, further comprising the step of mechanochemical exfoliating graphite into graphene/graphite oxide flakes is done in a stirred media mill, and the stirred media mill is an attrition mill or ball mill.

8. A method of making a high strength structure: comprising:
- providing substantially flat GO flakes;
- providing a reinforcing fiber;
- providing the structure's host material;
- coating the GO flakes on the reinforcing fiber;
- air drying the coated fiber;
- incorporating the coated fiber into the structure's host material; and
- forming the structure's host material with the incorporated coated fiber into a structure; and
- wherein 95% of the substantially flat GO flakes have a surface area to thickness ratio of a minimum of 300 Angstroms and a thickness of less than 160 Angstroms, wherein the graphene flakes have no significant physical surface distortions and no significant epoxy functionalization, and wherein surfaces of the GO flakes have the same hydrophobicity as the host material.

9. The method of claim 8, wherein the GO flakes have an oxidation level greater than 1.5% by mass, and further comprising combining the coated fiber with Ordinary Portland Cement and other dry powders.

10. The method of claim 8, further comprising the step of mixing the coated fiber in the host material for at least 30 minutes in a sonic mixing system.

11. The method of claim 8, further comprising the step of adding water to react the host material with one or more materials that form concrete to form a concrete composite when cured.

12. The method of claim 8, wherein the GO flakes have with an oxidation level less than 1.5% by mass, and further comprising combining the coated fiber with sand and other dry powders.

13. The method of claim 8, further comprising the steps of mixing the coated fiber and the host material for at least 30 minutes in a sonic mixing system, and adding Bitumen or other non-polar material to react the host material to form a composite when cured.

14. The method of claim 8, wherein the GO flakes have mass greater than 0.00005% than the mass of the host material.

15. The method of claim 8, wherein 95% of the GO flakes are from about 0.8 to 16 nanometers in thickness.

16. The method of claim 8, wherein the maximum dimension of the GO flakes is between 220 Angstroms and 100 microns.

17. The method of claim 8, wherein the GO flakes have primarily edge oxidation.

18. The method of claim 8, further comprising the step of mechano-chemical exfoliating graphite into graphene/graphite oxide flakes in a stirred media mill, and the stirred media mill is an attrition mill or ball mill.

* * * * *